US008612368B2

(12) United States Patent
Burdick et al.

(10) Patent No.: US 8,612,368 B2
(45) Date of Patent: Dec. 17, 2013

(54) SYSTEMS AND METHODS FOR PROCESSING MACHINE LEARNING ALGORITHMS IN A MAPREDUCE ENVIRONMENT

(75) Inventors: Douglas Ronald Burdick, San Jose, CA (US); Amol Ghoting, Yorktown Heights, NY (US); Rajasekar Krishnamurthy, San Jose, CA (US); Edwin Peter Dawson Pednault, Yorktown Heights, NY (US); Berthold Reinwald, San Jose, CA (US); Vikas Sindhwani, Yorktown Heights, NY (US); Shirish Tatikonda, San Jose, CA (US); Yuanyuan Tian, San Jose, CA (US); Shivakumar Vaithyanathan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 13/038,086

(22) Filed: Mar. 1, 2011

(65) Prior Publication Data

US 2012/0226639 A1 Sep. 6, 2012

(51) Int. Cl.
*G06F 15/18* (2006.01)
(52) U.S. Cl.
USPC .......................................................... 706/12
(58) Field of Classification Search
None
See application file for complete search history.

(56) References Cited

U.S. PATENT DOCUMENTS

| | | | |
|---|---|---|---|
| 7,222,127 B1 * | 5/2007 | Bem et al. .............................. | 1/1 |
| 7,650,331 B1 * | 1/2010 | Dean et al. .................... | 712/203 |
| 7,844,959 B2 | 11/2010 | Isard | |
| 7,886,046 B1 * | 2/2011 | Zeitoun et al. ................. | 709/224 |
| 2008/0086442 A1 * | 4/2008 | Dasdan et al. .................... | 707/1 |
| 2008/0098375 A1 | 4/2008 | Isard | |
| 2010/0205588 A1 * | 8/2010 | Yu et al. ......................... | 717/149 |
| 2010/0241828 A1 * | 9/2010 | Yu et al. ........................... | 712/30 |
| 2010/0332461 A1 * | 12/2010 | Friedman et al. ............. | 707/687 |
| 2011/0047172 A1 * | 2/2011 | Chen et al. ..................... | 707/764 |
| 2011/0246573 A1 * | 10/2011 | Liu et al. ........................ | 709/204 |
| 2012/0016816 A1 * | 1/2012 | Yanase et al. .................... | 706/10 |
| 2012/0089969 A1 * | 4/2012 | Varadarajan et al. .......... | 717/136 |

OTHER PUBLICATIONS

Chu C., et al, "Map-Reduce for Machine Learning on Multicore", Advances in neural information processing systems, 19, 281, 2007.*
Gillick D., et al., "MapReduce: Distributed Computing for Machine Learning", Berkley, Dec. 18, 2006.*

(Continued)

*Primary Examiner* — Jeffrey A Gaffin
*Assistant Examiner* — Dave Misir
(74) *Attorney, Agent, or Firm* — Cantor Colburn LLP; Yusuke Kanehira

(57) ABSTRACT

Systems and methods for processing Machine Learning (ML) algorithms in a MapReduce environment are described. In one embodiment of a method, the method includes receiving a ML algorithm to be executed in the MapReduce environment. The method further includes parsing the ML algorithm into a plurality of statement blocks in a sequence, wherein each statement block comprises a plurality of basic operations (hops). The method also includes automatically determining an execution plan for each statement block, wherein at least one of the execution plans comprises one or more low-level operations (lops). The method further includes implementing the execution plans in the sequence of the plurality of the statement blocks.

25 Claims, 10 Drawing Sheets

(56) References Cited

OTHER PUBLICATIONS

Isard M., et al., "Distributed Data-Parallel Computing Using a High-Level Programming Language", ACM SIGMOD'09, Jun. 29-Jul. 2, 2009, Providence, Rhode Island, USA, pp. 987-994.*

Yu Y., et al., "Distributed Aggregation for Data-Parallel Computing: Interfaces and Implementations", ACM SOSP'09, Oct. 11-14, 2009, Big Sky, Montana, USA pp. 247-260.*

CA International Search Report and Written Opinion for International Application No. PCT/CA2012/050123; International Filing Date; Feb. 29, 2012; Date of mailing: Jul. 16, 2012, 8 pages.

Ghoting, A.; Krishnamurthy, R; Pednault, E.; Reinwald,B.; Sindhwani, V.; Tatikonda, S.: Yuanyuan Tian; Vaithyanathan, S.;, "SystemML: Declarative machine learning on MapReduce," Data Engineering (ICDE), 2011 IEEE Proceedings of the 27th International Conference on Data Engineering, pp. 231-242, Apr. 11-16, 2011.

Ranger,C.; Raghuraman, R.; Penmetsa, A.; Bradski, G.; Kozyrakis, C.;, "Evaluating MapReduce for Multi-core and Multiprocessor Systems," High Performance Computer Architecture, 2007. HPCA 2007. Proceedings of the IEEE 13th International Symposium on High Performance Computer Architecture, pp. 13-24, Feb. 10-14, 2007.

R. Chaiken et al., "Scope: Easy and Efficient Parallel Processing of Massive Data Sets", Proc. of PVLDB '08, Aug. 23-28, 2008, Auckland, New Zealand, pp. 1265-1276.

Y. Yu et al., "DryadLINQ: A System for General-Purpose Distributed Data-Parallel Computing Using a High-Level Language", Proceedings of 8th USENIX Symposium on Operating Systems Design and Implementation (OSDI), Dec. 8-10, 2008, 14 pages.

M. Isard et al., "Dryad: Distributed Data-Parallel Programs from Sequential Building Blocks", Proceedings of EuroSys '07, Mar. 21-23, 2007, Lisbon, Portugal, pp. 59-72.

U. Kang et al., "Pegasus: A Peta-Scale Graph Mining System Implementation and Observations", Proceedings of Ninth IEEE Int'l. Conf. on Data Mining, ICDM '09, Dec. 6-9, 2009, pp. 229-238.

* cited by examiner

SYSTEMS AND METHODS FOR PROCESSING MACHINE LEARNING ALGORITHMS IN A MAPREDUCE ENVIRONMENT

FIELD OF THE INVENTION

Embodiments of the disclosure relate generally to the field of data processing systems. For example, embodiments of the disclosure relate to systems and methods for processing machine learning algorithms in a MapReduce environment (e.g., Apache® Hadoop!).

BACKGROUND

There is a growing use of machine learning (ML) algorithms on datasets to extract and analyze information. As datasets grow in size for applications such as topic modeling, recommender systems, and internet search queries, there is a need for scalable implementations of ML algorithms on large datasets. Present implementations of ML algorithms require manual tuning on specialized hardware, and methods to parallelize individual learning algorithms on a cluster of machines must be manually implemented.

Parallel processing is used to increase speed of execution and amounts of data to be processed. However, using a distributed network or plurality of processors means there will exist larger plurality of possible execution strategies for a job. One problem is that selecting a good execution strategy from the plurality, especially for implementing a plurality of ML algorithms, falls on the programmer.

SUMMARY

Systems and methods for processing Machine Learning (ML) algorithms in a MapReduce environment are described. In one embodiment, the method includes receiving a ML algorithm to be executed in the MapReduce environment. The method further includes parsing the ML algorithm into a plurality of statement blocks in a sequence, wherein each statement block comprises a plurality of basic operations (hops). The method also includes automatically determining an execution plan for each statement block, wherein at least one of the execution plans comprises one or more low-level operations (lops). The method further includes implementing the execution plans in the sequence of the plurality of the statement blocks.

This illustrative embodiment is mentioned not to limit or define the invention, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF PREFERRED EMBODIMENTS

Embodiments of the disclosure relate generally to the field of data processing systems. For example, embodiments of the disclosure relate to systems and methods for processing machine learning algorithms in a MapReduce environment. Throughout the description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

MapReduce is a generic parallel programming paradigm for large clusters of machines. Combined with the growing need to run machine learning (ML) algorithms on massive data-sets, the present disclosure describes novel methods and systems for implementing ML algorithms on MapReduce. This disclosure describes systems and methods in which machine learning algorithms are expressed in a higher-level language and executed in a MapReduce environment. The higher level language exposes several constructs that constitute key building blocks for a broad class of supervised and unsupervised machine learning algorithms. The algorithms expressed in the higher-level language are compiled and optimized into a set of MapReduce jobs running on a cluster of machines. The disclosure also describes a number of optimization strategies for efficiently executing these algorithms on MapReduce frameworks (e.g., Apache® Hadoop!).

As described by the following description, the declarative higher-level language for writing ML algorithms frees a user from low-level implementation details and performance-tuning of implementing the algorithm in MapReduce. Additionally, the systems and methods provides performance that scales to very large datasets. The performance is comparable to hand-tuned implementation for individual algorithms.

MapReduce

Operationally, MapReduce consists of three phases: "Map" phase where the input data is separated out into different key-value pairs; "Shuffle" phase where the same key from different mappers are brought together; and "Reduce" phase where all values associated with an individual key are analyzed in union. Typically, the Map and the Reduce phases are exposed while the Shuffle phase is internal to the platform. However, the cost of the Shuffle phase is an important aspect of optimizations described in this disclosure.

SystemML

Figure 1:
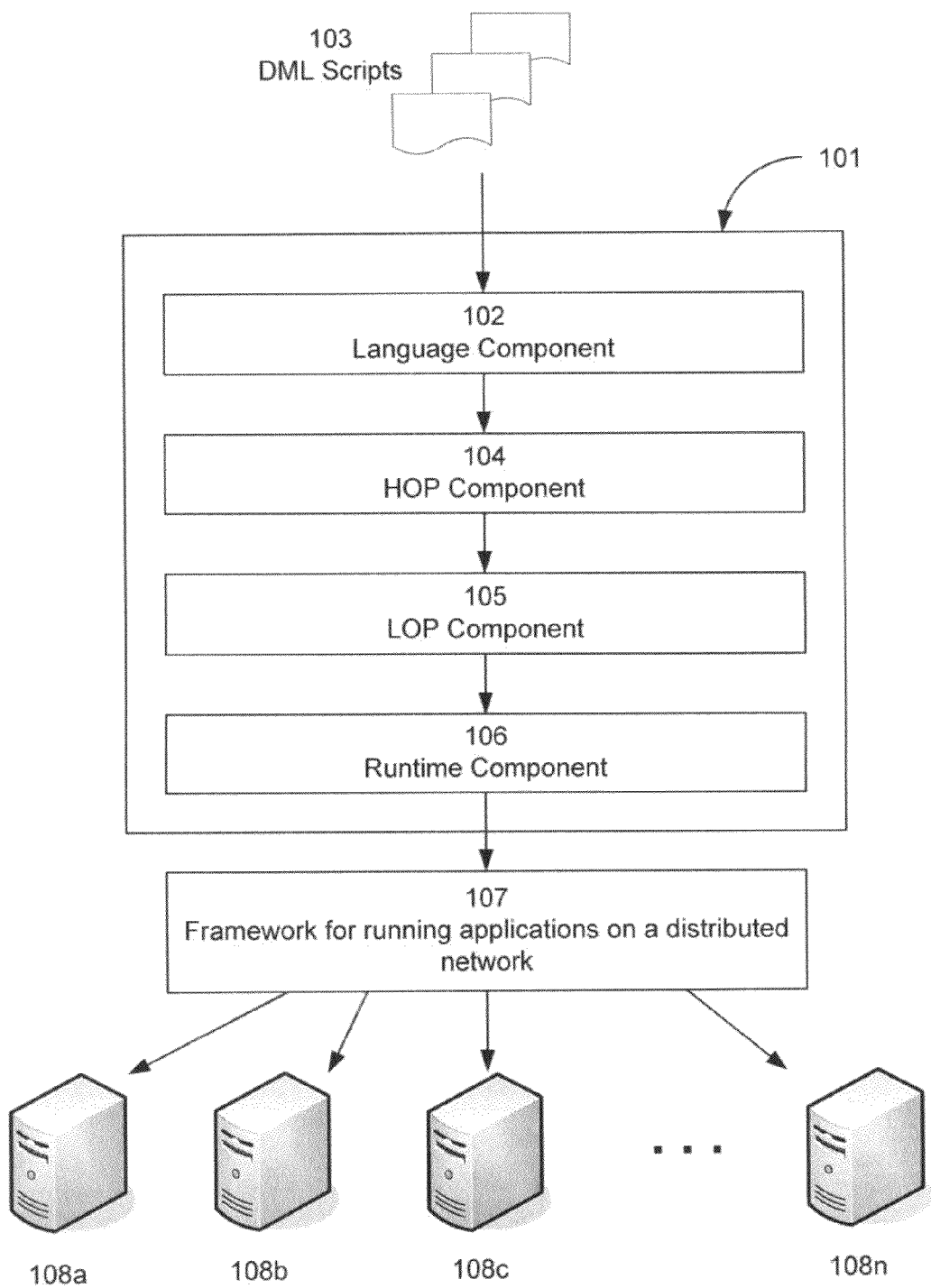
FIG. 1 illustrates an exemplary system for implementing machine learning algorithms in a MapReduce environment.

FIG. 1 illustrates an exemplary embodiment of a system 101 (called "SystemML" in this disclosure) for implementing ML algorithms in a MapReduce environment. SystemML 101 generally includes a Language Component 102 to accept Declarative Machine learning Language (DML) scripts 103, a High-Level Operator (HOP) Component 104 coupled to the Language Component 102, a Low-Level Operator (LOP) Component 105 coupled to the HOP Component 104, and a Runtime Component 106 coupled to the LOP Component 105. In one embodiment, the Runtime Component 106 connects with a distributed network or cluster 107-108a-n to execute the scripts.

Declarative Machine Learning Language

Declarative Machine learning Language (DML) is a declarative language whose syntax closely resembles the syntax of programming language R. To enable more system generated optimization, DML does not provide all the flexibility available in R. However, the loss of flexibility results largely in loss of program convenience and does not have much impact in expressing the class of ML algorithms in DML. DML constructs are explained using example script 1 (below), which is the Gaussian Non-Negative Matrix Factorization (GNMF) algorithm (algorithm 1, below).

---

Algorithm 1: GNMF

1: V = read("in/V");
2: W = read("in/W");
3: H = read("in/H");
4: max iteration = 20;
5: i = 0;
6: while i < max iteration do
7:    H = H * ($W^T$ V/$W^T$WH);
8:    W = W * (V $H^T$/WH$H^T$);
9:    i = i + 1;
10: end while
11: write(W,"out/W");
12: write(H,"out/H");

---

Script 1: GNMF

1: V=readMM("in/V", rows=1e8, cols=1e5, nnzs=1e10);
2: W=readMM("in/W", rows=1e8, cols=10);
3: H=readMM("in/H", rows=10, cols=1e5);
4: max iteration=20;
5: i=0;
6: while(i<max iteration) {
7:    H=H*(t(W)%*%V)/(t(W)%*%W%*%H);
8:    W=W*(V%*%t(H))/(W%*%H%*%t(H));
9:    i=i+1;}
10:writeMM(W, "out/W");
11:writeMM(H, "out/H");

---

DML supports three main data types: matrices, vectors, and scalars. Supported scalar data types are integer, double, string and logical. The cells in a matrix or vector may consist of integer, double or string values. A DML program consists of a sequence of statements, with the default computation semantics being sequential evaluation of the individual statements. The following constructs are currently supported in DML:

Input/Output: ReadMM (Matrix Multiplication) and WriteMM statements are respectively provided for reading and writing vectors and matrices from and to files. Optionally, in the Read statement, the user can provide additional properties of the matrix or vector, such as dimensionality and sparsity (number of non-zero entries or nnzs).

Control Structures: Control structures supported in DML include the while statement, for statement and if statement. Steps 6-9 in Script 1 show an example while statement.

Assignment: An assignment statement consists of an expression and the result of which is assigned to a variable (e.g., Steps 7-9 in Script 1). The assignment can be to a scalar, vector or matrix.

DML supports the following main types of operators:

Arithmetic: Arithmetic operators include multiplication, division, addition, and subtraction. Arithmetic operators extend naturally to vectors and matrices where the semantics dictate that the operator is applied to the corresponding cells.

Relational/Boolean: Relational/Boolean operators include less than, greater than, and equal to.

Internal Functions: Internal functions include aggregate functions (e.g., sum, rowSum), mathematical functions such as sin and log, and linear algebra functions (e.g., transpose t, diag).

DML also allows users to define their own functions using the syntax "function (arglist) body." The arglist includes a set of formal input and output arguments. The body is a group of valid DML statements.

In comparing DML to the R programming language, DML does not support advanced programming features such as object oriented features, advanced data types (e.g., lists and arrays), and advanced function support (e.g., accessing variables in the caller function and further up in the call-stack). Additionally, DML does not support extensive graphical procedures that are supported by R.

Exemplary Method for SystemML

Figure 2:
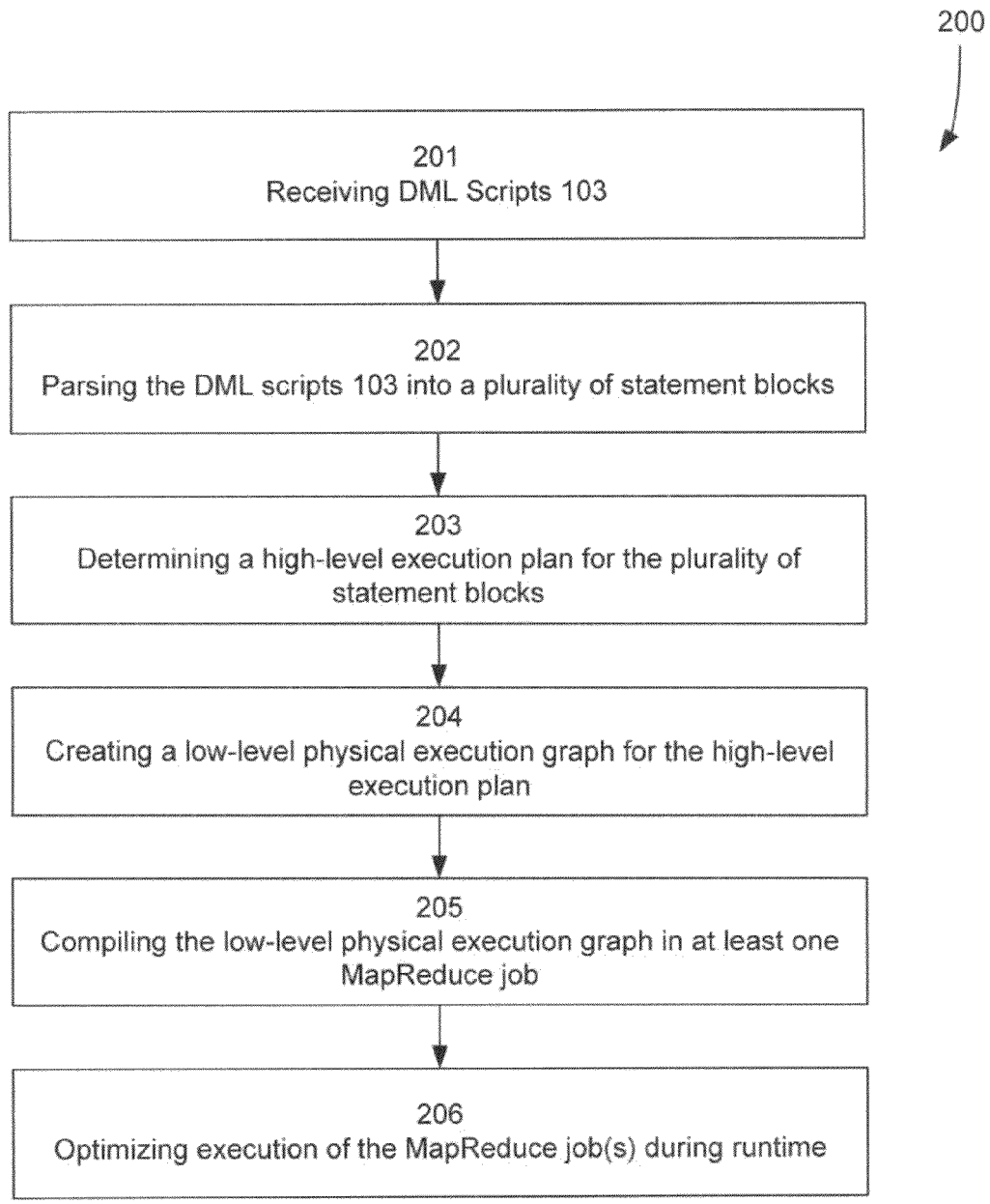
FIG. 2 illustrates an exemplary method performed by the system of FIG. 1 in implementing machine learning algorithms in a MapReduce environment.
Figure 3:
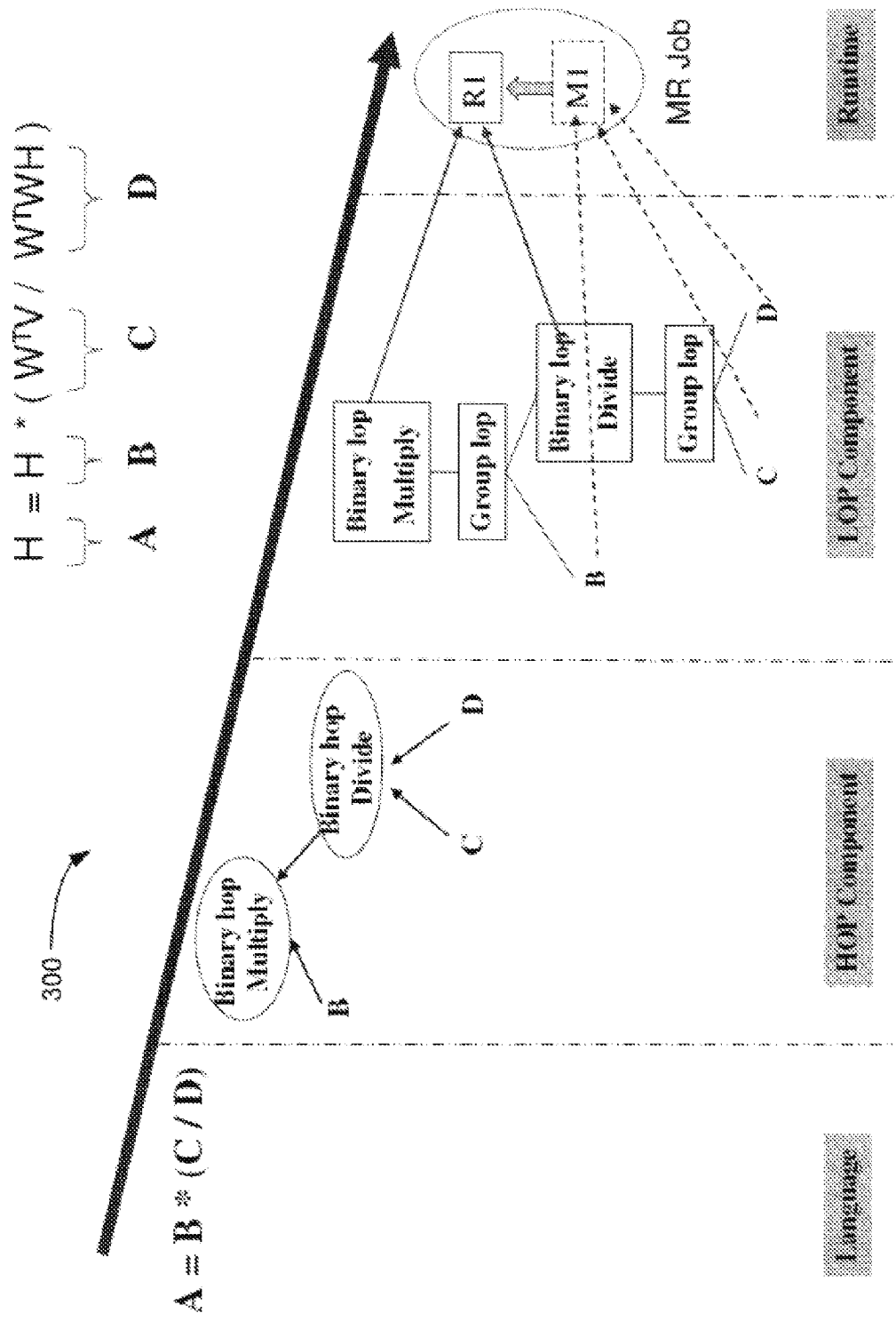
FIG. 3 illustrates an example processing of a simple statement A=B*(C/D) by the system illustrated in FIG. 1 performing the method illustrated in FIG. 2.

FIG. 2 illustrates an exemplary embodiment of method 200 performed by SystemML 101 in implementing ML algorithms in a MapReduce environment. Additionally, FIG. 3 illustrates an example processing 300 of a simple statement A=B*(C/D), which will be used for illustrative purposes in describing the exemplary method 200. Beginning at 201, the Language Component 102 of SystemML 101 receives DML scripts 103 for an ML algorithm to be implemented. Proceeding to 202, the Language Component 102 breaks the algorithm into a parsed representation of smaller units called statement blocks.

Figure 4:
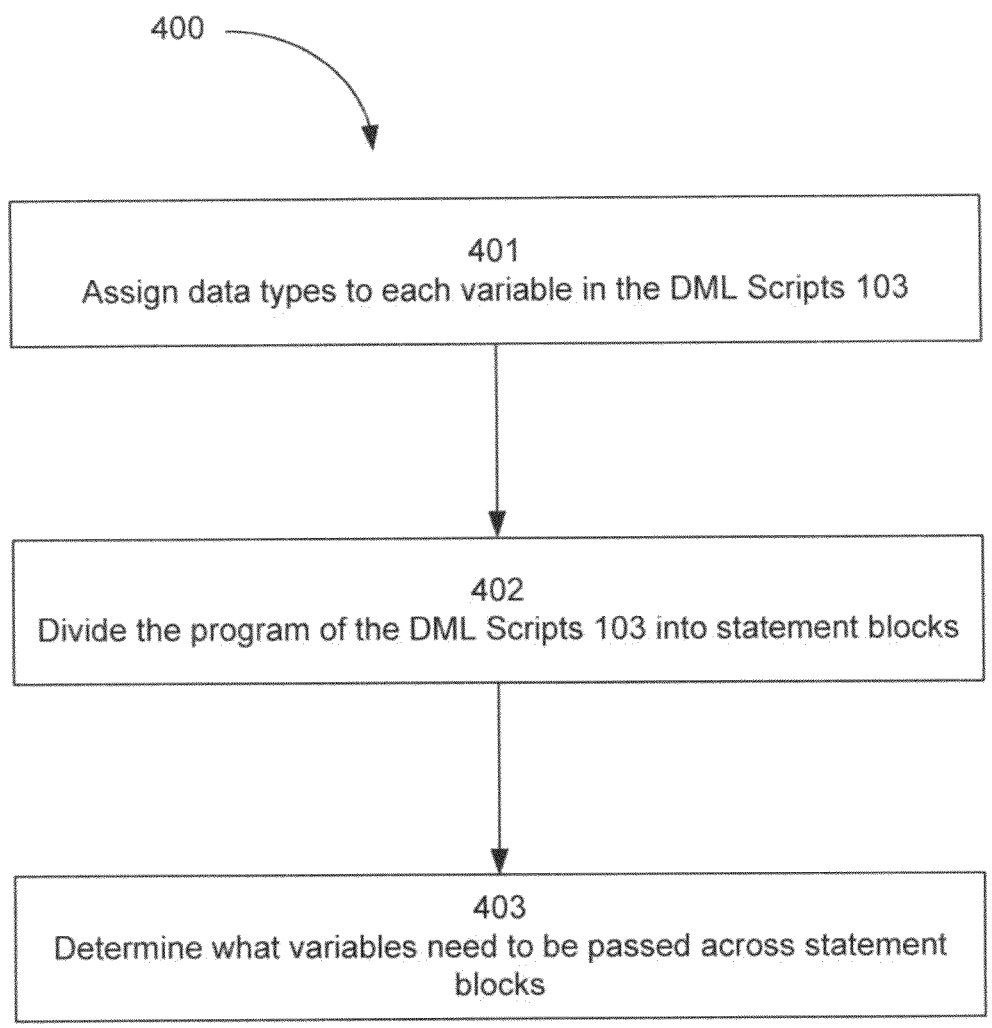
FIG. 4 illustrates an exemplary method for generating a parsed representation as in the method illustrated in FIG. 2.

FIG. 4 illustrates an exemplary embodiment of method 400 for generating a parsed representation. Beginning at 401, data types are assigned to each variable in the DML script. For example, from Script 1, ReadMM statements (Steps 1-3) are used to type V, W and H as matrices, while Assignment statements (Steps 4-5) are used to identify max iteration and i as scalar variables.

Proceeding to 402, the program is divided into statement blocks. Continuing the example from Script 1, Consecutive Assignment, ReadMM and WriteMM statements are combined into a single statement block, as the operations involved in these statements can be collectively optimized. Control structures (e.g., while loops and functions) introduce natural boundaries that statement blocks cannot cross. Script 1 breaks down into three statement blocks (below):

Statement Block 1
1: V=readMM("in/V", rows=1e8, cols=1e5, nnzs=1e10);
2: W=readMM("in/W", rows=1e8, cols=10);
3: H=readMM("in/H", rows=10, cols=1e5);
4: max iteration=20;
5: i=0;
Statement Block 2
6: while (i<max iteration) do
7: H=H*(t(W) %*% V)/(t(W) %*% W %*% H);
8: W=W*(V %*% t(H))/(W %*% H %*% t(H));
9: i=i+1;
Statement Block 3
10: writeMM(W, "out/W");
11: writeMM(H, "out/H");

In one embodiment, different types of statement blocks exist. The different types of statement blocks may include: (1) a simple statement block (e.g., including basic script that is run one time during execution, such as Statement Block 1 above); (2) a repeating statement block (statement blocks whose script may be executed more than once, e.g., loops in code, including for, while, do-while, etc., such as Statement Block 2 above); and (3) skip statement blocks (statement blocks whose script may not be executed, e.g., a conditional statement, such as if, etc.). When executing the associated lops for a statement block, the type of statement block may be used to determine how and whether to execute the low-level operations (e.g., skipping lops for a skip statement block whose if condition is not met for execution).

Proceeding to 403, SystemML 101 determines what variables need to be passed across statement blocks. For example, variable W used in Step 7 refers to the output of Step 2 (for the first iteration of the loop) and Step 8 for second iteration onwards. In determining what variables need to be passed across statement blocks, each use of a variable in the script is connected with the immediately preceding write(s) for that variable across different evaluation paths.

Referring back to FIG. 2, proceeding to 203, the HOP Component 104 determines a high-level execution plan for the plurality of statement blocks. The HOP Component 104 receives the parsed representation of a statement block as input and produces a directed acyclic graph of basic operations (hops) over matrices, vectors, and scalars (HOPDag). The following are the available hops (and their semantics) in SystemML 101:

Binary (e.g., b(/)): A binary hop takes two inputs (where each input is a matrix, vector, or scalar) and performs one of the following operations: *, +, −, /, min, max, etc.

Unary (e.g., u(+)): An unary hop takes as input two operands: (1) a matrix, vector or a scalar, and (2) a scalar constant. The unary hop then performs one of the following operations: *, +, −, /.

AggUnary (e.g., a(+)): An AggUnary hop aggregates a set of cells in a matrix or vector. For example, colSum computes the sum of every column in a matrix and returns a vector of the sums.

AggBinary (e.g., a(+*)): An AggBinary hop takes two inputs where each input is a matrix or a vector. The AggBinary hop then performs a Binary operation followed by an aggregate operation (e.g., +, Min, Max, etc.).

Reorg (e.g., r(T)): A reorg hop changes the index of every cell in a matrix such as the transpose of a matrix.

Data: A data hop reads or writes a matrix, vector or scalar. Data hops can be transient or persistent with respect to the lifetime of a script.

Figure 5:
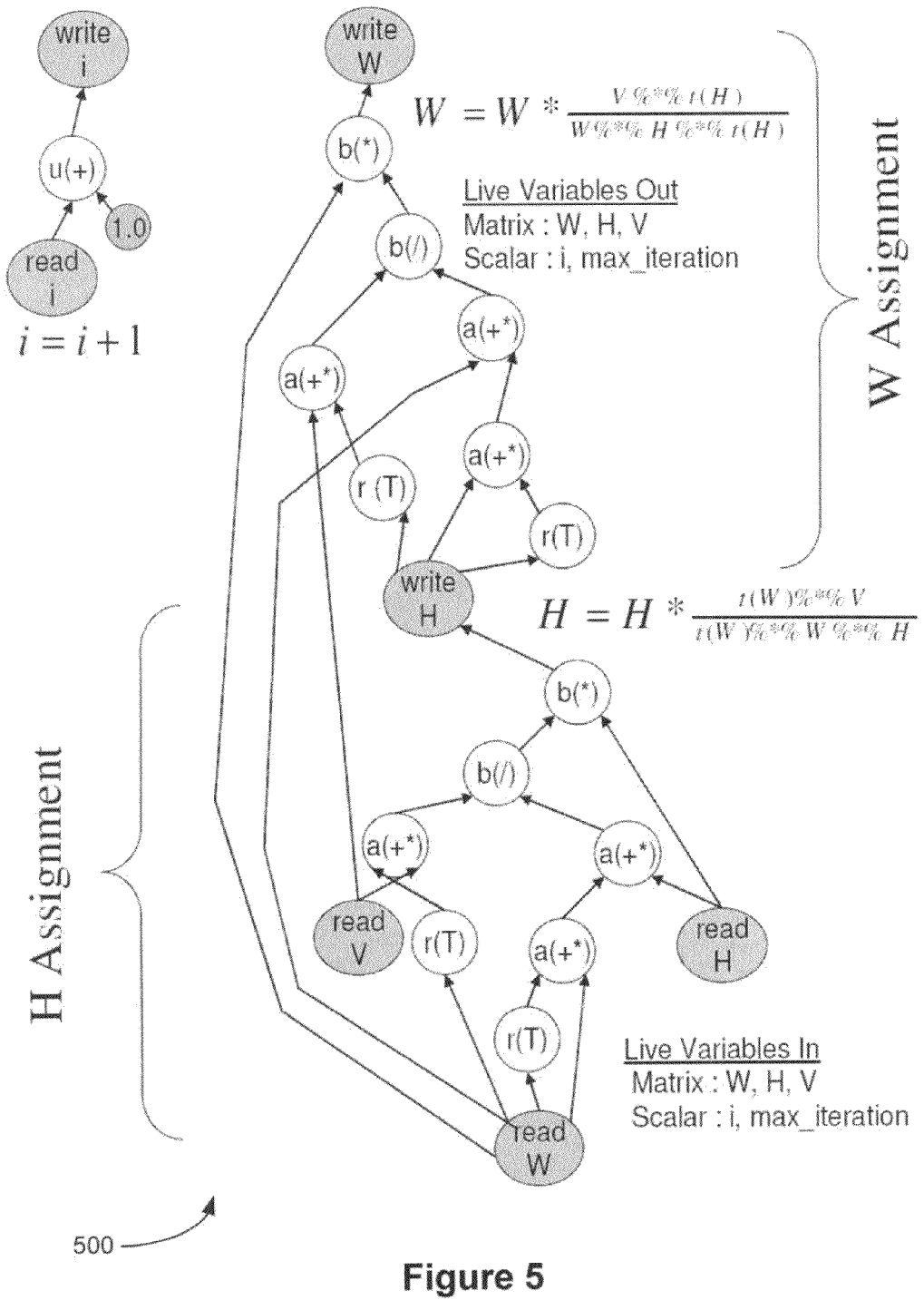
FIG. 5 illustrates an example directed acyclic graph of basic operations as created by the system illustrated in FIG. 1 performing the method illustrated in FIG. 2.

In creating a HOPDag, a statement block is represented in one HOPDag. FIG. 5 illustrates the HOPDag using the hops introduced above for the body of the While loop in Statement Block 2 from Script 1. In one embodiment, multiple statements in the statement block may be combined into a single HOPDag. For example, the Read W data hop feeds into the r T reorg hop, which in turn feeds into the a(+*) AggBinary hop together with the Read W data hop to represent the t(W) % * % W part of the statement block. As a program is parsed and analyzed, hops are instantiated and connected to build a HOPDag for the statement blocks in the program. While the figure illustrates the HOPDag being connected, it should be noted that a HOPDag does not have to be connected.

The grayed Read data hops represent the live-in variables for matrices W, H, and V, and scalar i at the beginning of an iteration. The grayed Write data hops represent the live-out variables at the end of an iteration that need to be passed onto the next iteration. These data hops—which are transient— implicitly connect HOPDags of different statement blocks with each other by mapping the transient Write data hops (sinks) of the HOPDag of one statement block to the transient Read data hops (sources) of the HOPDag of the next statement block, or the next iteration of the while loop.

Referring back to FIG. 2, proceeding to 205, the LOP Component 105 translates the HOPDag into low-level physical execution graphs (LOPDags). A low-level operator (lop) represents a basic operation in a MapReduce environment. Each lop takes one or more sets of key-value pairs as input and generates one or more key-value pairs as output. The following are lops supported in SystemML 101:

binary: A binary lop performs computations involving two inputs where each input is a set of key-value pairs.

unary: A unary lop performs computations where one input is a set of key-value pairs and the other input is a scalar value.

group: A group lop groups all key-value pairs with the same key.

aggregate: An aggregate lop applies an aggregation function over the set of values associated with the same key.

transform: A transform lop applies a transformation function (e.g., transpose) on each input key.

data: A data lop represents an input data source or output data sink.

lops to support matrix multiplication:
mmcj: A mmcj lop corresponds to cross product computation in cross product based matrix multiplication (CPMM).
mmrj: A mmrj lop corresponds to computation in replication based matrix multiplication (RMM).

Figure 6:
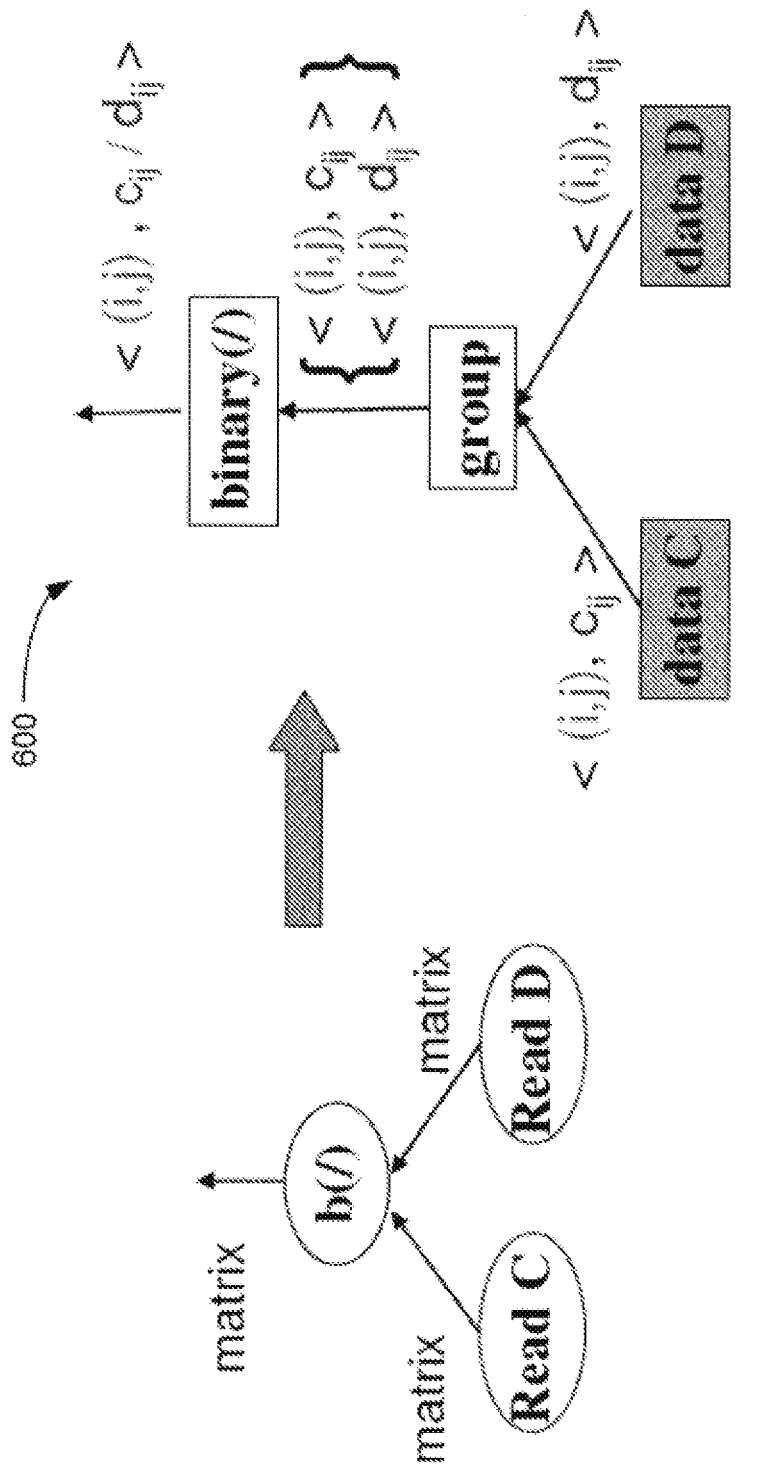
FIG. 6 illustrates an example of corresponding lops for a binary hop representing C/D

In one embodiment of creating a LOPDag, the HOPDag is processed in a bottom-up fashion, wherein each hop is converted into one or more lops. FIG. 6 illustrates an example of corresponding lops 600 for the binary hop C/D (illustrated in FIG. 3, from algorithm 1). At the bottom, each of the two data lops returns one set of key-value pairs for the input matrices. Conceptually, one entry for each cell in the individual matrices would be returned. However, a data lop typically returns multiple cells for each key (the number of cells returned is determined by an appropriate blocking strategy). A group lop then groups the multiple entries for the two inputs. The results are then passed to a binary lop to perform the division of the corresponding cell-values from the two input matrices.

In one embodiment, cost-based optimization may be used in creating a LOPDag. In creating a LOPDag, a plurality of choices may exist for translating a hop into one or more lops. Therefore, cost-based optimizations that consider various data characteristics of involved matrices may be used to lower the transaction cost for the chosen group of lops for the hop. One example of cost-based optimization includes selecting from multiple methods of performing matrix multiplication, as later described.

Returning to FIG. 2, proceeding to 205, the LOP Component 105 compiles the LOPDags into at least one MapReduce job. Translating each lop into a separate MapReduce job would result in multiple scans of input data and intermediate results. Therefore, if multiple lops are packaged into a single MapReduce job, the resulting reduction in scans typically result in an improvement in efficiency. Multiple properties of lops exist that assist in packaging multiple lops into one MapReduce job. For example, two such properties are the following:

Location, meaning can the lops be performed in either Map or Reduce or both.

Key characteristics, meaning should the input keys be grouped, are the output keys produced grouped, and whether the lop generates new output keys.

In one embodiment, a greedy piggybacking heuristic algorithm (below as algorithm 2) is used to analyze and group multiple lops into one MapReduce job.

---

Algorithm 2: Piggybacking -- Packing lops that can be evaluated together in a single MapReduce job Input: LOP-Dag
Output: A workflow of MapReduce Jobs(MRJobs)
[$N_{Map}$, $N_{MapOrRed}$, $N_{MapAndRed}$, $N_{Red}$] = TopologicalSort(LOP-Dag);
while(Nodes in LOP-Dag remain to be assigned) do
   Job ←create a new MapReduce job;
   addNodesByLocation($N_{Map}$ ∪ $N_{MapOrRed}$, Map, Job);
   addNodesByLocation($N_{MapAndRed}$, MapAndReduce, Job);
   addNodesByLocation($N_{MapOrRed}$ ∪ $N_{MapAndRed}$ ∪ $N_{Red}$, Reduce, Job);
   add Job to MRJobs;
end while
return MRJobs
{Method to add nodes that are ready to be assigned for a specific execution location}
Method: addNodesByLocation ( S, loc, Job )
while(true) do
   Z ← (Φ)
   while( S is not empty ) do
     n ←S.next( )
     if (n is not yet assigned and all descendants of n have been assigned) then
        if(loc is Map ) then
           add n to Z
        else if ( loc is MapAndReduce ) then
           add n to Z if n does not have any descendant lop in Z and Job whose location is MapAndReduce
        else if (loc is Reduce) then
           if ( n is a group lop ) then
               add n to Z only if n has a descendant group lop in Z or Job; and none of the lops between these two group lops alter keys
           else
               add n to Z if n is not a group lop
           end if
        end if
     end if
   end while
   break if Z is empty
   add Z to Job.Map, Job.MapAndReduce, or Job.Reduce, based on loc
end while

---

Figure 7:
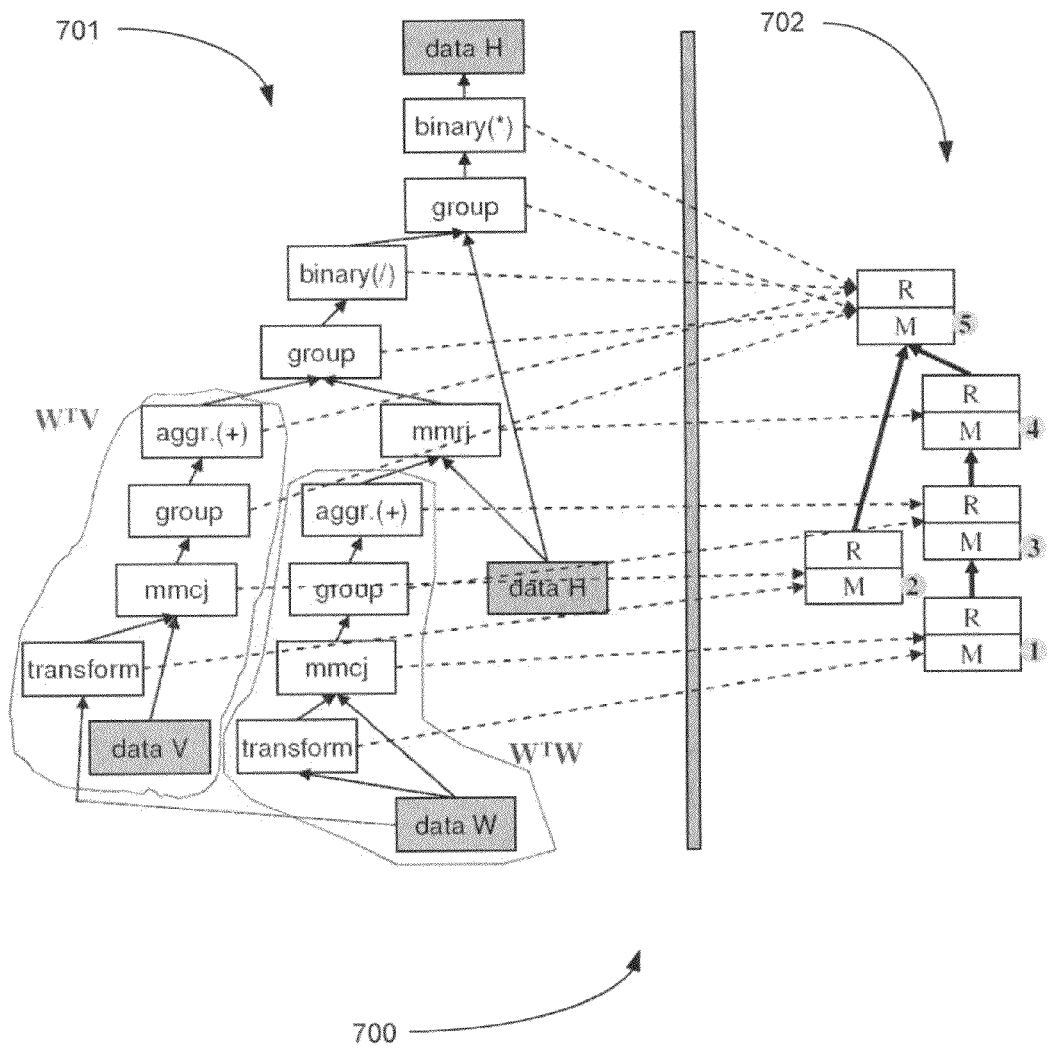
FIG. 7 illustrates an example of packaging lops into MapReduce jobs by the system illustrated in FIG. 1 performing the method illustrated in FIG. 2.

To continue the example from script 1, FIG. 7 illustrates an example 700 of packaging lops into MapReduce jobs for step 7. 701 (left portion of 700) illustrates the generated LOPDag for the part of the HOPDag 500 (FIG. 5) labeled "H Assignment." 702 (right portion of 700) illustrates the corresponding MapReduce jobs for the LOPDag 701.

Returning to FIG. 2, proceeding to 206, the Runtime Component 106 optimizes execution of the MapReduce job(s) during runtime. In one embodiment, there exists three main considerations in the Runtime Component 106 of SystemML 101: (1) key-value representation of matrices and vectors; (2) an MR runtime to execute individual LOPDags over MapReduce; and (3) a control module to orchestrate the execution.

For a key-value representation of matrices and vectors, SystemML 101 partitions matrices and vectors into blocks (called blocking) and exploits local sparsity within a block to optimize the number of key-value pairs representing matrices and vectors. Blocks are smaller rectangular sub-matrices using a designated block-size. Each block is represented in a key-value pair. The key denotes the block id. The value carries all of the cell values in the block. Local Sparsity refers to the sparsity of an individual block. The layout of the values in a block is decided based on the sparsity in the block (i.e., the fraction of non-zero values in the block).

In one embodiment, dynamic block-level operations are based on local sparsity of the block. Hence, local sparsity information is used to decide on the appropriate execution at runtime per block. In one embodiment, there is a separate algorithm inside every lop to account for the fact that individual blocks may be dense or sparse.

For example, if matrix multiplication is to be performed on two individual blocks, the actual multiplication algorithm chosen in the lop is decided based on the local sparsity of the two input blocks. If both blocks are dense, the runtime chooses an algorithm that cycles through every cell in both blocks. However, if one of the blocks is sparse, the runtime chooses an algorithm that cycles through only the nonzero cells in the sparse block, which are multiplied with the values in the corresponding cells in the dense block.

For an MR runtime to execute individual LOPDags over MapReduce, a generic MapReduce job (G-MR) is the main execution engine in SystemML 101. The G-MR is instantiated by the piggybacking algorithm (algorithm 2 above) with one or more lops. To illustrate an example instantiation of G-MR, the MapReduce job marked 1 in 702 of FIG. 7 includes three lops: data W; transform; and mmcj. To instantiate the MapReduce job, G-MR is parameterized as follows:

The Map phase of the MapReduce job runs data, transform, and the map portion of mmcj in sequence as indicated by the LOP Component 105.

The Reduce phase of the MapReduce job performs the reduce portion of mmcj.

The control module of the Runtime Component 106 orchestrates the execution of all MapReduce jobs for a DML script. In one embodiment, the control module performs the following operations: (i) instruction scheduling and (ii) instruction execution. Such operations performed in the control module include scalar computations in the script (e.g., scalar arithmetic operations and predicate evaluations) and metadata operations (e.g., deletion of intermediate results) during the execution of DML scripts.

SystemML 101 may execute the resulting MapReduce jobs by sending the resulting jobs to a framework for running applications on a distributed network 107. One example framework is Apache® Hadoop! for processing the jobs on distributed nodes 108a-n.

Matrix Multiplication

SystemML 101 supports at least two matrix multiplication algorithms, RMM and CPMM. To illustrate RMM and CPMM, let A and B be blocked matrices with $M_b \times K_b$ blocks in A and $K_b \times N_b$ blocks in B. The matrix multiplication computation at the block level corresponds to $$C_{i,j} = \sum_k A_{i,k} \times B_{k,j}$$

where the indices denote block ids.

Figure 8:
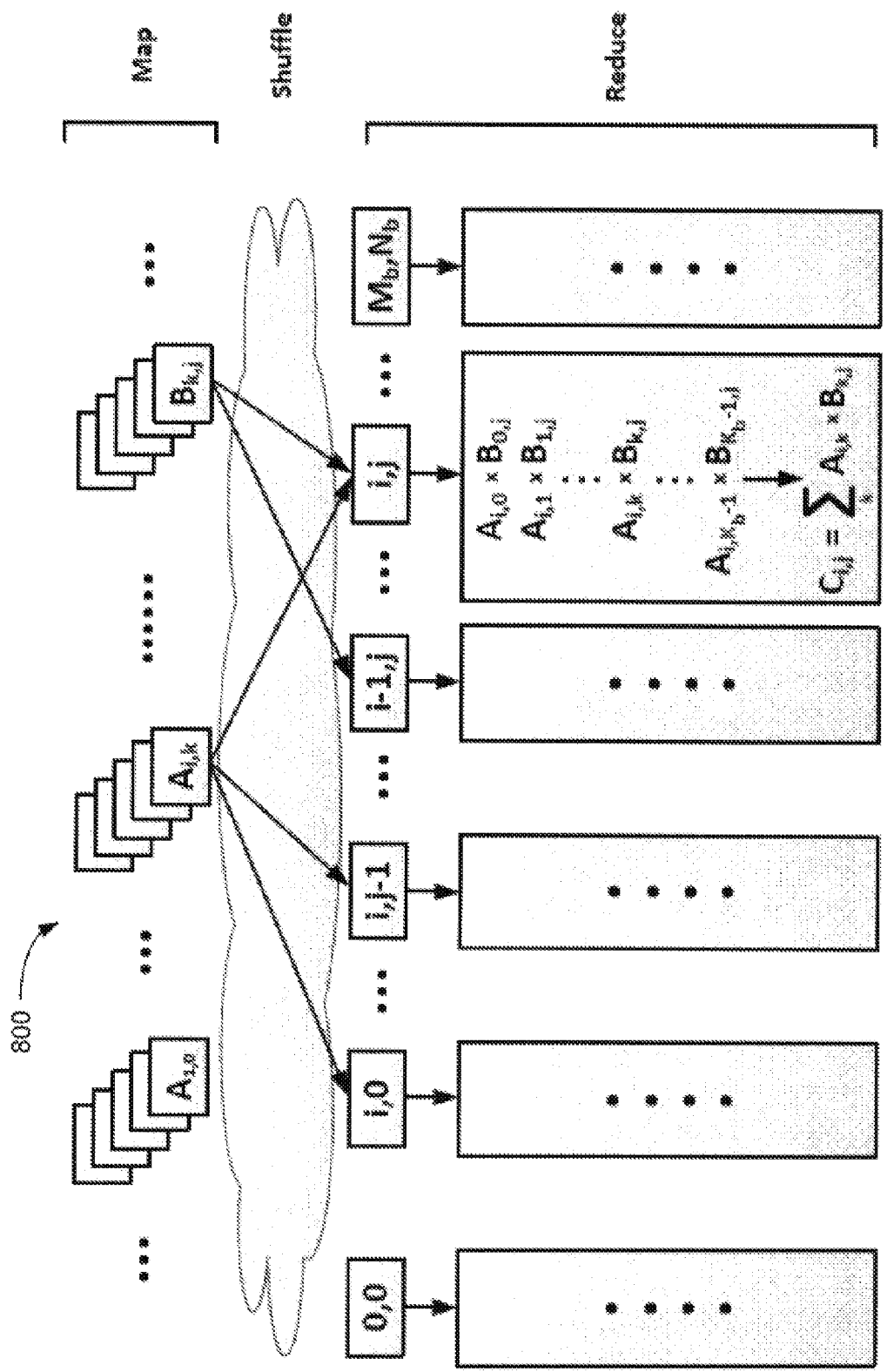
FIG. 8 illustrates the replication based matrix multiplication algorithm.

FIG. 8 illustrates the RMM algorithm 800, which requires only one MapReduce job for execution. The LOPDag for the execution plan including RMM contains a single mmrj lop (implemented in G-MR). In the RMM algorithm 800, a reducer is to access all blocks of A and B that are necessary to compute each result block of C. Since each block A contributes to the computation of several result blocks, the mapper sends the number of copies of A to compute the several result blocks to the corresponding reducers. The same is done for each block B, too, with the reducer now having all required blocks to compute C.

Figure 9:
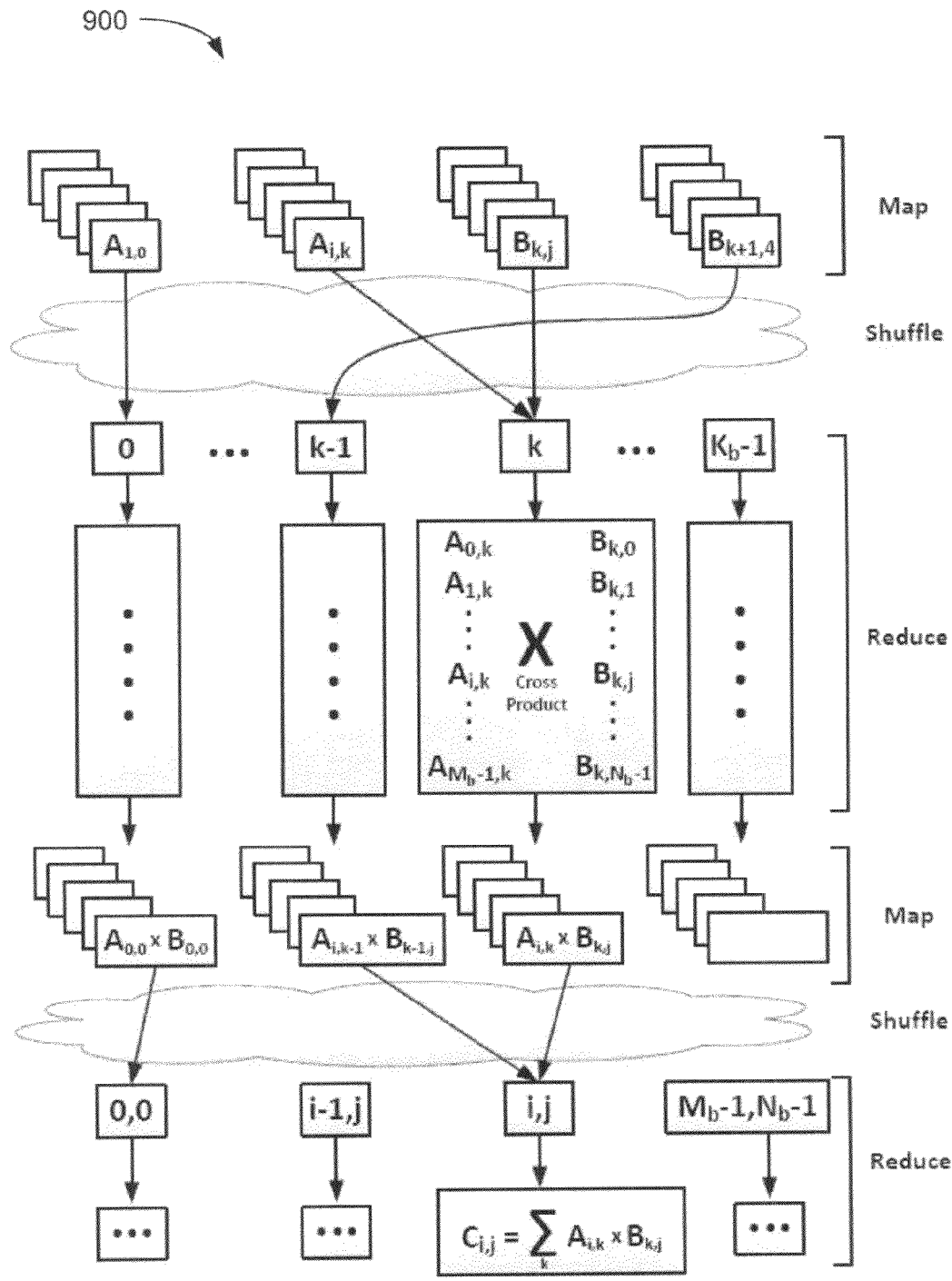
FIG. 9 illustrates the cross product based matrix multiplication algorithm.

FIG. 9 illustrates the CPMM algorithm 900, which requires two MapReduce jobs for execution. CPMM is represented in LOPDags as a sequence of three lops: mmcj; group; and aggregate. Referring back to FIG. 7, example 700 illustrates a CPMM evaluation for the computation of $W^T W$. The mapper of the first MapReduce job reads the two input matrices A and B and groups input blocks from A and B by common key k. Hence, the reducer performs a cross product to compute C, ($C_{i,j}^k = A_{i,k} \times B_{k,j}$). In the second MapReduce job, the mapper reads the results from the previous MapReduce job and groups all $C_{i,j}^k$'s by the key (i,j). In the Reduce phase, the aggregate lop computes $$C_{i,j} = \sum_k C_{i,j}^k.$$

For CPMM, SystemML 101 may include an optimized implementation of mmcj. In one embodiment, the optimized implementation is a local aggregator that enables partial aggregation in the reducer. The first MapReduce output is $C_{i,j}^k$ for $1 \le k \le K_b$. When $K_b$ is larger than the number of available reducers r, each reducer may process multiple groups. For example, a reducer may apply a cross product on k=k' and k=k'', then the same reducer would compute both $C_{i,j}^{k'} = A_{i,k'} \times B_{k',j}$ and $C_{i,j}^{k''} = A_{i,k''} \times B_{k'',j}$. As previously described for CPMM, the outputs from the first MapReduce job are aggregated in the second MapReduce job as $$C_{i,j} = \sum_k C_{i,j}^k.$$

Therefore, instead of separately outputting $C_{i,j}^{k'}$ and $C_{i,j}^{k''}$, a local aggregator may partially aggregate within the reducer.

In one embodiment, to prevent partial aggregations from being too large to fit into memory, a disk-based local aggregator may be implemented. The disk-based local aggregator is configured to use an in-memory buffer pool to perform local aggregation. If cross product results spill to disk, the results may be sorted to ensure that partial aggregation for subsequent groups is performed efficiently.

For matrix multiplication, SystemML 101 selects between CPMM and RMM. In one embodiment, SystemML 101 optimizes the selection through comparing cost models for using the different algorithms. For RMM, mappers replicate each block of A and B the number of times equal to the aggregate number of blocks of C to be computed for each block of A and B (noted as number $N_b$ for A and number $M_b$ for B). As a result, $N_b|A|+M_b|B|$ data is shuffled in the MapReduce job. Therefore, the cost model for RMM is cost(RMM)=shuffle$(N_b|A|+M_b|B|)+IO_{dfs}(|A|+|B|+|C|)$.

For CPMM, in the first MapReduce job, mappers read blocks of A and B and send the blocks to reducers. Hence, the amount of data shuffled is $|A|+|B|$. As previously described, the reducers perform cross products for each k and apply a local aggregator to partially aggregate the results across different values of k within a reducer. Hence, the size of the result set produced by each reducer is bounded by $|C|$. Therefore, when there are r reducers in the job, the amount of data written to DFS is bounded by $r|C|$. In the second MapReduce job, the data from the first MapReduce job is read, shuffled, and fed into the reducers to produce a final result. Hence, the cost for CPMM is bounded by the following cost model: cost(CPMM) shuffle$(|A|+|B|+r|C|)+IO_{dfs}(|A|+|B|+|C|+2r|C|)$.

Therefore, in one embodiment, SystemML 101 compares cost(RMM) to cost(CPMM) to determine an appropriate algorithm for a particular matrix multiplication. In one example, when both A and B are very large, CPMM typically will perform better than RMM (since the shuffle overhead for RMM would be large). In another example, if one matrix is small enough to fit into one block, the overhead is low enough such that RMM typically will perform better than CPMM. It should be noted that when a data shuffle and $IO_{dfs}$ operation are of the same size, the data shuffle is a more expensive operation because it involves network overhead and local file system 10 and external sorting.

Exemplary Computer Architecture for Implementation of Systems and Methods

Figure 10:
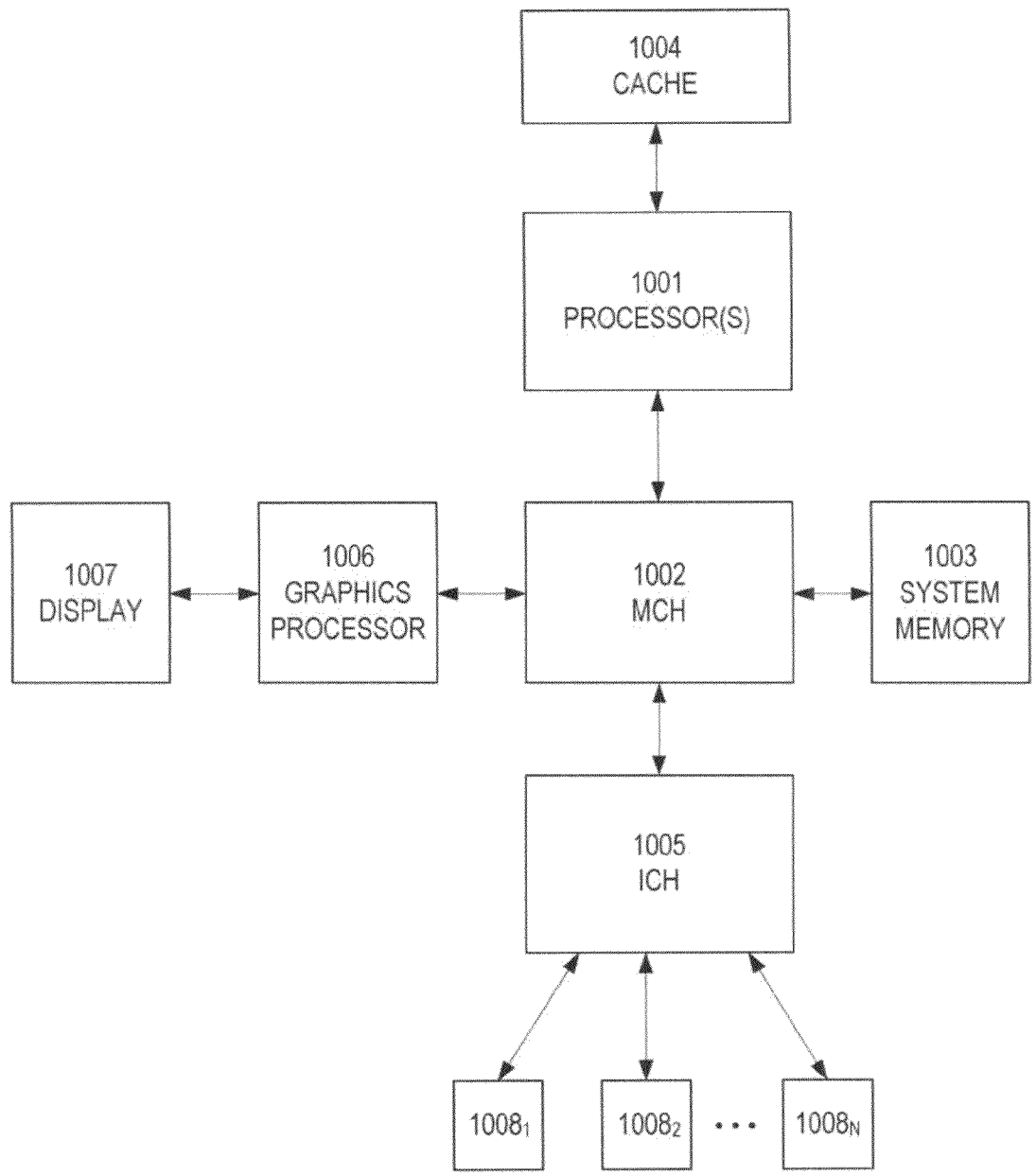
FIG. 10 illustrates an example computer architecture for implementing the system illustrated in FIG. 1 and the method illustrated in FIG. 2.

FIG. 10 illustrates an example computer architecture for implementing the systems and methods described in this disclosure. The exemplary computing system of FIG. 10 includes: 1) one or more processors 1001; 2) a memory control hub (MCH) 1002; 3) a system memory 1003 (of which different types exist such as DDR RAM, EDO RAM, etc,); 4) a cache 1004; 5) an I/O control hub (ICH) 1005; 6) a graphics processor 1006; 7) a display/screen 1007 (of which different types exist such as Cathode Ray Tube (CRT), Thin Film Transistor (TFT), Liquid Crystal Display (LCD), DPL, etc.); and/or 8) one or more I/O devices 1008.

The one or more processors 1001 execute instructions in order to perform whatever software routines the computing system implements. The instructions frequently involve some sort of operation performed upon data. Both data and instructions are stored in system memory 1003 and cache 1004. Cache 1004 is typically designed to have shorter latency times than system memory 1003. For example, cache 1004 might be integrated onto the same silicon chip(s) as the processor(s) and/or constructed with faster SRAM cells whilst system memory 1003 might be constructed with slower DRAM cells. By tending to store more frequently used instructions and data in the cache 1004 as opposed to the system memory 1003, the overall performance efficiency of the computing system improves.

System memory 1003 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1003 prior to their being operated upon by the one or more processor(s) 1001 in the implementation of a software program. Similarly, data that a software program determines should be sent from the computing system to an outside entity through one of the computing system interfaces, or stored into an internal storage element, is often temporarily queued in system memory 1003 prior to its being transmitted or stored.

The ICH 1005 is responsible for ensuring that such data is properly passed between the system memory 1003 and its appropriate corresponding computing system interface (and internal storage device if the computing system is so designed). The MCH 1002 is responsible for managing the various contending requests for system memory 1003 access amongst the processor(s) 1001, interfaces and internal storage elements that may proximately arise in time with respect to one another.

One or more I/O devices 1008 are also implemented in a typical computing system. I/O devices generally are responsible for transferring data to and/or from the computing system (e.g., a networking adapter); or, for large scale non-volatile storage within the computing system (e.g., hard disk drive). ICH 1005 has bi-directional point-to-point links between itself and the observed I/O devices 1008.

Components of the different embodiments of a claimed system may include software, hardware, firmware, or any combination thereof. The components may be software programs available to the public or special or general purpose processors running proprietary or public software. The software may also be specialized programs written specifically for signature creation and organization and recompilation management. For example, storage of the system may include, but is not limited to, hardware (such as floppy diskettes, optical disks, CD-ROMs, and magneto-optical disks, ROMs, RAMs, EPROMs, EEPROMs, flash, magnetic or optical cards, propagation media or other type of media/machine-readable medium), software (such as instructions to require storage of information on a hardware storage unit, or any combination thereof.

In addition, elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, flash, magnetic or optical cards, propagation media or other type of media/machine-readable medium suitable for storing electronic instructions.

For the exemplary methods illustrated in FIGS. 2 and 4, embodiments of the invention may include the various processes as set forth above. The processes may be embodied in machine-executable instructions which cause a general-purpose or special-purpose processor to perform certain steps. Alternatively, these processes may be performed by specific hardware components that contain hardwired logic for performing the processes, or by any combination of programmed computer components and custom hardware components.

Embodiments of the invention do not require all of the various processes presented, and it may be conceived by one skilled in the art as to how to practice the embodiments of the invention without specific processes presented or with extra processes not presented. For example, while one machine is described in FIG. 10, embodiments of the disclosure may be embodied across a plurality of machines. For example, translation may be performed in a distributed computing environment, wherein portions of the methods may be performed on different computers situated within the distributed network. Additionally, and as is illustrated in FIG. 1, execution of the jobs may be performed in a distributed computing environment.

General

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

What is claimed is:

1. A computer implemented method for processing Machine Learning (ML) algorithms in a MapReduce environment, comprising:
    receiving a ML algorithm to be executed in the MapReduce environment;
    parsing the ML algorithm into a plurality of statement blocks in a sequence, wherein each statement block comprises a plurality of basic operations (hops);
    automatically determining an execution plan for each statement block, wherein at least one of the execution plans comprises one or more low-level operations (lops), and wherein determining an execution plan for each statement block comprises translating a hop into at least one lop; and
    implementing the execution plans in the sequence of the plurality of the statement blocks.

2. The computer implemented method of claim 1, wherein determining the execution plan for at least one of the statement blocks comprises:
    analyzing the statement block to determine interconnections between the plurality of hops; and
    using the interconnections to create a directed acyclic graph of the plurality of hops over at least one of matrices and scalars (HOPDag).

3. The computer implemented method of claim 2, wherein determining the execution plan for each statement block further comprises translating the HOPDag into at least one low-level physical execution plan (LOPDag) comprising a plurality of lops.

4. The computer implemented method of claim 3, wherein the LOPDag further comprises representations for scalar operations.

5. The computer implemented method of claim 1, wherein translating the hop into at least one lop comprises:
    determining a plurality of groups of lops equivalent to the hop; and
    using a cost-based optimization to select a group of lops from the plurality of groups of lops with an associated cost lower than an associated cost of at least one of the groups of lops.

6. The computer implemented method of claim 3, wherein determining the execution plan for each statement block further comprises converting the LOPDag into a representative workflow of MapReduce jobs, wherein converting the LOPDag comprises determining if a plurality of lops may be represented by one MapReduce job.

7. The computer implemented method of claim 6, wherein determining the execution plan for each statement block further comprises optimizing the HOPDag, wherein optimization of the HOPDag comprises at least one of algebraic rewrites and selection of physical representation for a plurality of intermediate matrices.

8. The computer implemented method of claim 6, wherein determining the execution plan for each statement block further comprises optimizing a LOPDag during translation of a HOPDag into the LOPDag by using cost-based optimization.

9. The computer implemented method of claim 1, wherein implementing the execution plans comprises managing execution of scalar operations by a control program and a plurality of workflows of MapReduce jobs on a cluster.

10. The computer implemented method of claim 9, wherein execution of the plurality of workflows of MapReduce jobs comprises using the type of statement block from which the workflow was created to determine if the workflow should be skipped in execution or repeated in execution.

11. The computer implemented method of claim 1, further comprising determining if a plurality of lops may be represented by one MapReduce job, wherein such determination comprises piggybacking lops into one MapReduce job based on the characteristics of the lops.

12. The computer implemented method of claim 11, further comprising creating the MapReduce job, wherein the MapReduce job is instantiated from a generic MapReduce job that is divided into at least three phases, each phase parameterized to execute multiple lops as per the piggybacking method.

13. The computer implemented method of claim 1, further comprising optimizing the execution plan, comprising optimizing size of a data block representation for implementing the ML algorithm.

14. The computer implemented method of claim 13, wherein the optimizing size of the data block representation relies on the local sparsity of each data block.

15. A computer program product comprising a non-transitory computer useable storage medium to store a computer readable program, wherein the computer readable program, when executed on a computer, causes the computer to perform operations for processing Machine Learning (ML) algorithms in a MapReduce environment, comprising:
  receiving a ML algorithm to be executed in the MapReduce environment;
  parsing the ML algorithm into a plurality of statement blocks in a sequence, wherein each statement block comprises a plurality of basic operations (hops);
  automatically determining an execution plan for each statement block, wherein at least one of the execution plans comprises one or more low-level operations (lops), and wherein determining an execution plan for each statement block comprises translating a hop into at least one lop;
  implementing the execution plans in the sequence of the plurality of the statement blocks; and
  determining if a plurality of lops may be represented by one MapReduce job, wherein such determination comprises piggybacking lops into one MapReduce job based on the characteristics of the lops.

16. The computer program product of claim 15, wherein the computer readable program causes the computer to perform operations for determining the execution plan for at least one of the statement blocks comprising:
  analyzing the statement block to determine interconnections between the plurality of hops; and
  using the interconnections to create a directed acyclic graph of the plurality of hops over at least one of matrices and scalars (HOPDag).

17. The computer program product of claim 16, wherein the computer readable program causes the computer to perform operations for determining the execution plan for each statement block comprising translating the HOPDag into at least one low-level physical execution plan (LOPDag) comprising a plurality of lops.

18. The computer program product of claim 17, wherein the LOPDag further comprises representations for scalar operations.

19. The computer program product of claim 18, wherein the computer readable program causes the computer to perform operations for translating the HOPDag into at least one LOPDag comprising, for each hop implemented in the HOPDag, translating the hop into at least one lop.

20. The computer program product of claim 19, wherein the computer readable program causes the computer to perform operations for determining the execution plan for each statement block comprising converting the lops into MapReduce jobs, wherein converting the lops comprises determining if a plurality of lops may be represented by one MapReduce job.

21. The computer program product of claim 20, wherein the computer readable program causes the computer to perform operations for determining if the plurality of lops may be represented by one MapReduce job comprising piggybacking lops into one MapReduce job.

22. The computer program product of claim 19, wherein the computer readable program causes the computer to perform operations for determining the execution plan for each statement block comprising optimizing the HOPDag, wherein optimization of the HOPDag comprises at least one of algebraic rewrites and selection of physical representation for a plurality of intermediate matrices.

23. The computer program product of claim 19, wherein the computer readable program causes the computer to perform operations for determining the execution plan for each statement block comprising optimizing a LOPDag during translation of a HOPDag into the LOPDag, wherein such translation comprises:
  determining a plurality of groups of lops equivalent to the hop; and
  using a cost-based optimization to select a group of lops from the plurality of groups of lops with an associated cost lower than an associated cost of at least one of the groups of lops.

24. A system for processing Machine Learning (ML) algorithms in a MapReduce environment, comprising:
  means for receiving a ML algorithm to be executed in the MapReduce environment;
  means for parsing the ML algorithm into a plurality of statement blocks in a sequence, wherein each statement block comprises a plurality of basic operations (hops);
  means for automatically determining an execution plan for each statement block, wherein at least one of the execution plans comprises one or more low-level operations (lops);
  means for implementing the execution plans in the sequence of the plurality of the statement blocks;
  means for optimizing the execution plan comprises means for optimizing size of a data block representation for implementing the ML algorithm.

25. The system of claim 24, wherein:
  means for determining the execution plan for each statement block comprises means for creating a directed acyclic graph of the plurality of hops over at least one of matrices, vectors, and scalars (HOPDag);
  means for determining the execution plan for each statement block comprises means for translating the HOPDag into at least one low-level physical execution plan (LOPDag) comprising a plurality of lops;

means for translating the HOPDag into at least one LOP-Dag comprises means for, for each hop implemented in the HOPDag, translating the hop into at least one lop; and means for determining the execution plan for each statement block comprises means for converting the lops into a plurality of workflows of MapReduce jobs, wherein converting the lops comprises piggybacking a plurality of lops into one MapReduce job.

* * * * *